United States Patent [19]

Goyert et al.

[11] Patent Number: 4,500,671

[45] Date of Patent: Feb. 19, 1985

[54] REINFORCED POLYURETHANE THERMOPLASTIC CHEMICAL MATERIALS AND PROCESSES FOR THEIR PREPARATION

[75] Inventors: Wilhelm Goyert, Cologne; Wolfgang Grimm, Leverkusen; Albert Awater, Odenthal; Hans Wagner, Dormagen; Bruno Krüger, Leverkusen, all of Fed. Rep. of Germany

[73] Assignee: Bayer Aktiengesellschaft, Bayerwerk, Fed. Rep. of Germany

[21] Appl. No.: 616,452

[22] Filed: Jun. 1, 1984

Related U.S. Application Data

[63] Continuation of Ser. No. 103,003, Dec. 13, 1979, abandoned.

[30] Foreign Application Priority Data

Dec. 16, 1978 [DE] Fed. Rep. of Germany ....... 2854406

[51] Int. Cl.$^3$ .................... C08K 3/40; C08L 75/04; C08L 55/02
[52] U.S. Cl. .................................... 524/494; 525/66; 525/127; 525/128; 524/504; 524/850
[58] Field of Search ................... 525/66; 524/504, 494

[56] References Cited

U.S. PATENT DOCUMENTS

| | | | |
|---|---|---|---|
| 2,993,013 | 7/1961 | Wolfe, Jr. | 260/2.5 |
| 3,049,505 | 8/1962 | Grabowski | 260/45.4 |
| 3,970,715 | 7/1976 | Jarrett | 260/859 R |
| 3,970,717 | 7/1976 | Muller-Albrecht et al. | 260/859 R |
| 4,035,550 | 7/1977 | Suh et al. | 524/494 |
| 4,093,569 | 6/1978 | Reischl et al. | 260/2.5 AM |
| 4,179,479 | 12/1979 | Carter | 525/66 |

FOREIGN PATENT DOCUMENTS

| | | |
|---|---|---|
| 2337706 | 2/1974 | Fed. Rep. of Germany. |
| 1333188 | 10/1973 | United Kingdom. |
| 1357904 | 6/1974 | United Kingdom. |

*Primary Examiner*—Carman J. Seccuro
*Attorney, Agent, or Firm*—Gene Harsh; Joseph C. Gil; Lyndanne M. Whalen

[57] ABSTRACT

The instant invention is directed to thermoplastic chemical material comprising:
(A) from 60 to 97%, by weight, based on (A)+(B), of a thermoplastic polyurethane; and
(B) from 40 to 3%, by weight, based on (A)+(B), of a fibrous reinforcing material; and
(C) from 36 to 3 parts, by weight, based on 100 parts of (A)+(B), of a polar polymer.

The instant invention is also directed to a process for the production of the thermoplastic chemical materials.

20 Claims, No Drawings

REINFORCED POLYURETHANE THERMOPLASTIC CHEMICAL MATERIALS AND PROCESSES FOR THEIR PREPARATION

This application is a continuation of application Ser. No. 103,003, filed Dec. 13, 1979, now abandoned.

BACKGROUND OF THE INVENTION

This invention relates to new chemical materials having improved thermal stability under load, comprising a polyurethane ("PUR"), a fibrous reinforcing substance and a polar polymer based on olefinically unsaturated monomers.

It is known that glass fibers may be incorporated in a wide variety of thermoplasts, including thermoplastic polyurethanes ("TPU"). Products of this type, however, have insufficient impact strength in the cold when produced on the basis of a rigid polyurethane and insufficient green strength on removal from the mold and little tear strength when produced on the basis of flexible polyurethane.

It is also known that mixtures (so-called "blends") of thermoplasts containing TPU and ABS (acrylonitrile-/butadiene/styrene) polymers may be produced, e.g. by coextrusion. The ABS polymer is generally prepared using ca. 30%, by weight, of butadiene (see g.g. U.S. Pat. No. 3,049,505). One disadvantage of these thermoplastic blends is the insufficient thermal stability under load thereof. Even at 80° C., the material may no longer withstand relatively high loads. The impact strength of these blends at low temperatures is also only moderate and the abrasion resistance is poor. Molded articles obtained from these products cannot be stacked immediately after the removal thereof from the mold because they still have insufficient strength.

In German Offenlegungsschrift No. 2,014,385, there is described the reaction of copolymer latices based on butadiene, styrene, methacrylic acid, acrylonitrile, and the like, and containing reactive hydrogen atoms with polyisocyanates. The latex represents the continuous matrix of the finished material, which is not thermoplastic. In contrast to these materials, the products of the present invention, described below, have much greater strength and rigidity.

In German Offenlegungsschrift No. 2,627,073 there are claimed polyurethane dispersions in polyols, to which aqueous polymer latices may also be added. These dispersions serve as polyol components for the production of polyurethane materials. The products described in the examples cannot be worked thermoplastically. The same applies to U.S. Pat. No. 2,993,013.

Adhesives based on mixtures of polyurethane, styrene copolymers and ABS polymers are described in German Auslegeschrift No. 2,355,942. The presence of the styrene copolymers is essential for the adhesive action of these substances, but no mention is made in the publication of thermoplasts or the addition of glass fibers.

German Offenlegungsschrift No. 2,128,199 relates to copolymers which are prepared by the reaction of polyisocyanates with polyols in the presence of other thermoplasts. Some of these copolymers are not impact resistant (due to the addition of styrene) or they have only low mechanical strength characteristics. The thermal stability under load of these products is insufficient.

A thermoplastic material has now surprisingly been found, which combines very high mechanical strength, thermal stability under load even to temperatures over 110° C. and in some cases up to 160° C., with advantageously high impact strength at low temperatures. This material, which comprises thermoplastic polyurethane, glass fibers and polar polymer, may be shaped surprisingly well in the conventional processing machines for thermoplasts. The molded articles may be stacked and transported immediately after the formation thereof. They may easily be lacquered and show very good adherence of the lacquer. The impact strength in the cold at −30° C. is very high in spite of the presence of glass fibers and the fact that the PUR matrix is, in part, already frozen at this temperature.

DESCRIPTION OF THE INVENTION

The present invention thus relates to a thermoplastic chemical material comprising:

(A) from 60 to 97%, by weight, based on (A)+(B), of a thermoplastic polyurethane;

(B) from 40 to 3%, by weight, based on (A)+(B), of a fibrous reinforcing material; and (C) from 36 to 3 parts, by weight, preferably from 15 to 4 parts, by weight, based on 100 parts of (A)+(B), of a polar polymer.

The thermoplastic polyurethanes, component (A), are known and are prepared by processes generally known in the art. They are generally built up of long chain polyols having molecular weights from 400 to 10,000, diisocyanates and chain-extending agents (preferably short chain polyols), having molecular weights of up to 400, and the NCO/OH ratio is generally in the region of from 0.95:1 to 1.10:1.

The substantially linear polyols having molecular weights of from 400 to 10,000, preferably from 800 to 6000, which may be used according to the present invention include virtually all known polyesters, polylactones, polyethers, polythioethers, polyester amides, polycarbonates, polyacetals, and vinyl polymers which contain preferably two Zerewitinoff active groups (mainly hydroxyl groups), with the optional addition of minor quantities of compounds of this type containing three Zerewitinoff active groups. Examples of such polyols include: polybutadiene diols, polyhydroxyl compounds already containing urethane or urea groups, modified and unmodified natural polyols and compounds containing other Zerewitinoff active groups, such as amino, carboxyl or thiol groups. These compounds are known in the art and have been fully described, e.g. in German Offenlegungsschriften Nos. 2,302,564; 2,423,764; 2,549,372 (U.S. Pat. No. 3,963,679) and 2,402,840 (U.S. Pat. No. 3,984,607) and in German Auslegeshrift No. 2,457,387 (U.S. Pat. No. 4,035,213). According to the present invention, it is preferred to use hydroxyl-containing polyesters of glycols or adipic acid, phthalic and/or terephthalic acid and the hydrogenation products thereof, hydroxyl polycarbonates, polycaprolactones, polyethylene oxide, polypropylene oxide, polytetrahydrofuran and mixed polyethers of ethylene oxide and propylene oxide.

Suitable diisocyanates for use according to the present invention include the aliphatic, cycloaliphatic, aromatic, araliphatic and heterocyclic diisocyanates which are known in the art and have been described, e.g. in the above-mentioned German Offenlegungsschriften Nos. 2,302,564; 2,423,764; 2,549,372; 2,402,840 and 2,457,387. The following are preferred for the purposes of the present invention: hexamethylene diisocyanate optionally substituted by methyl groups, isophorone diisocyanate and 4,4′-diisocyanatodiphenylmethane.

The diisocyanates mentioned above may, if desired be used together with up to ca. 15 mol % (based on the diisocyanate) of a higher functional polyisocyanate must be limited to the level at which a fusible or thermoplastic product is still obtained. If a substantial quantity of higher functional isocyanates is used, this must generally be compensated by the addition of hydroxyl or amino compounds which have an average functionality of less than two (or also monoisocyanates), so that excessive chemical crosslinking of the product is avoided. It is, of course, also possible to carry out the reaction in such a manner, that chemical crosslinking of the elastomer takes place subsequently during lacquering (e.g. by using an excess of compounds containing isocyanate groups). Examples of higher functional isocyanates and monofunctional compounds may also be found in the prior art literature mentioned above. Examples include: monoamines (such as butylamine, dibutylamine, octylamine, stearylamine, N-methylstearylamine, pyrrolidine, piperidine and cyclohexylamine), and monohydric alcohols (such as butanol, 1-ethylhexanol, octanol, dodecanol, amyl alcohols, cyclohexanol and ethylene glycol monoethyl ether).

The chain-extending agents to be used according to the present invention are also known and have been described, e.g. in German Offenlegungsschriften Nos. 2,302,564; 2,423,764; 2,549,372; 2,402,799; 2,402,840 and 2,457,387. They include low molecular polyhydric alcohols (preferably glycols), polyamines, hydrazines, and hydrazides. Amino alcohols, such as ethanolamine, diethanolamine, N-methyl diethanolamine, triethanolamine and 3-aminopropanol, may also be used according to the present invention. Preferred chain-extending agents include: ethylene glycol, diethylene and triethylene glycols, 1,2-propane diol, 1,3- and 1,4-butane diol, 1,6-hexane diol, 2-ethylhexane diol-(1,3), 2,2-dimethylpropane diol, 1,4-bis-hydroxymethyl cyclohexane and hydroquinone dihydroxyethylether. The following are particularly preferred: hydroquinone-di-$\beta$-hydroxyethylether, 1,4-butane diol and 1,6-hexane diol.

Inorganic fibers are to be preferred to organic fibers as fibrous reinforcing substances, component (B), because they have a greater reinforcing effect. The thermal stability under load thereof is also greater. The inorganic fibers used for the present invention are preferably sized glass fibers having a thickness of from 8 to 30 m$\mu$, in particular from 10 to 18 m$\mu$, and a length of from 0.3 mm to ca. 100 mm, in particular from 1 to 10 mm, produced by processes known in the art.

Sizes for glass substantially consist of two components: a film-forming component (generally polyvinyl acetate, polyester, polyurethanes or epoxide resins) and a bonding agent, generally an organic silicon compound. When using the polyurethane-based sizes, which are preferred according to the present invention, at least one bonding agent containing amino groups should be present.

The glass fiber sizes may, in addition, also contain known antistatic agents and lubricants.

Processes for the production of glass fiber sizes based on polyurethanes have been described, e.g. in German Auslegeschriften Nos. 2,426,657 (British Pat. No. 1,456,628) and 2,426,654. Fillers, such as mica and other silicates, chalk and dyes, may also be added to the inorganic fibers.

The term "polar polymers", component (C), is used in the present invention to denote polymers which contain at least 10%, by weight, preferably at least 15% by weight, most preferably at least 20%, by weight, of polar monomer units and at the same time at least 30%, by weight, preferably more than 50%, by weight, of butadiene, isoprene and/or acrylic acid ester units based in each case on the total quantity of (C). By "polar monomers" are meant in particular the known acrylic and methacrylic acid alkyl esters, acrylonitrile, styrene and α-methylstyrene; less preferred are chloroprene, vinyl chloride and maleic acid anhydride. The most suitable acrylic and methacrylic acid esters are those having from 4 to 10 carbon atoms, preferably from 4 to 6 carbon atoms in the alcohol component. Not suitable for use as component (C) are the substantially apolar polymers, such as natural rubber, EPM, EPDM and butadiene homopolymers, presumably because they are insufficiently compatible with TPU. Substances of this type may, however, by included in limited amounts, preferably <10%, by weight, and most preferably <5%, by weight, based on component (C).

Homopolymers, copolymers, graft polymers and graft copolymers both crosslinked and in the uncrosslinked state, may also be used as component (C) according to the present invention, provided the composition thereof fulfills the criteria mentioned above. These polymers may be obtained by the polymerization of one or more olefinically unsaturated monomers by known methods (e.g. emulsion, suspension, solvent-free or solution polymerization or combinations of these methods), in which at least 10%, by weight, of the monomers should be polar and at least 30%, by weight, of the monomers should be chosen from the group comprising butadiene, isoprene and/or acrylic acid esters (if acrylic acid esters are used, these of course, also count as "polar monomers"). Graft polymers are particularly preferred as component (C) according to the present invention while crosslinked polymers are the least desirable.

Crosslinked polymers are obtained when, for example, uncrosslinked polymers are vulcanized to rubber in known manner by crosslinking with peroxide and/or sulfur, optionally in the presence of carbon black or other fillers.

Graft products suitable according to the present invention are obtained in known manner by polymerizing the monomers which are to be grafted in the presence of an elastomer component which is prepared by a separate polymerization. Preparation of graft products may be carried out by the polymerization processes generally known in the art, such as emulsion, suspension and solvent-free polymerization and combination of these methods. The graft products are preferably prepared by emulsion polymerization.

The elastomer component used as graft polymer backbone is preferably a rubber-like polymer having a glass transition temperature lower than −30° C. (DIN 53 445), in particular lower than −50° C. 1,3-diene rubber and acrylate rubbers are preferred, butadiene and/or isoprene polymers containing up to 30%, by weight, of styrene and/or acrylonitrile and homopolymers and copolymers of butadiene and the above-mentioned alkyl acrylates are particularly preferred. The proportion of diene used for the preparation of the graft polymer backbone is preferably from 50 to 95%, by weight, most preferably from 75 to 95%, by weight.

If the graft products are prepared by emulsion polymerization, the particle size of the graft polymer backbone (by this is meant the particle diameter $d_{50}$, i.e. the average diameter such that 50% of the particles have a larger and 50% a smaller diameter) is preferably in the range of from 0.05 to 0.8 μm. The graft polymer may be cross-linked or not. Products having a gel content above 30% (determined in toluene) are preferred.

Suitable monomers for grafting include in particular styrene, α-methylstyrene and acrylonitrile, but methacrylonitrile, alkyl esters of acrylic acid, alkyl esters of methacrylic acid or halogen derivatives of styrene and of α-methylstyrene may be used if particular effects are to be achieved. The graft monomers used are preferably mixtures of styrene and acrylonitrile in proportion, by weight, in the range of from 9:1 to 1:1.

The proportion, by weight, of graft polymer backbone to graft monomers is generally in the range of from 50:50 to 95:5, preferably from 70:30 to 87.5:12.5. Mixtures of several graft products in which each graft product satisfies the above-mentioned conditions separately may also be used.

The chemical materials according to the present invention may, in principle, be prepared by dry blending the previously prepared components (A) to (C), e.g. in internal mixers or extruders, but the polyurethane is preferably prepared in the presence of components (B) and (C) (suitably in a screw reactor).

The preferred process according to the present invention consists of feeding the rubber in a pulverulent form into the hopper of a self-cleaning multishaft screw extruder and introducing the fibrous material and the polyurethane-forming components into the extruder at the same or one or more other feed points. When the reaction of the polyurethane-forming component has been substantially completed, the material produced according to the present invention is discharged from the extruder, optionally granulated and then further processed to shape in known manner.

Suitable screw extruders are known and have been described, e.g. in German Pat. Nos. 813,154; 862,668 and 940,109; U.S. Pat. Nos. 3,233,025 and 3,642,964; German Offenlegungsschriften Nos. 2,447,368 and 2,610,980 and, in particular, German Auslegeschrift No. 2,302,564 and German Offenlegungsschrift No. 2,549,372 (U.S. Pat. No. 3,963,679). In the process according to the present invention, however, it is not necessary to equip the extruders with the specialized kneading elements mentioned in the last three mentioned publications.

For the preparation of polyester urethanes (and less advantageously for the preparation of 1,2-polypropylene glycol ether urethanes), peroxides, such as dicumyl peroxide, cumyl tert.-butylperoxide and α,α'-di-(tert.-butyl peroxy)diisopropylbenzene, may be added in amounts of up to 3% by weight, based on the quantity of rubber put into the process.

The polymers according to the present invention are particularly suitable for use where severe impact loads occur at low and high temperatures, e.g. in the interior and external parts of car bodies in the motor vehicle industry. They are also used for parts of electrical equipment which are subjected to dynamic stresses. Owing to the high impact strength at low temperatures, they are also particularly suitable for the manufacture of ski boots.

In the following Examples, the polyurethane reaction was carried out in a commerical double shaft screw extruder with kneader.

The dwell times of the reaction melt in the screw extruder are generally from 0.3 to 30 minutes, preferably from 0.5 to 4 minutes. The temperature in the screw housing ranges, from about 60° to 300° C. (from ca. 80° to 280° C. in the intake zone; from ca. 100° to 300° C. in the middle of the extruder and from ca. 60° to 250° C. in the discharge zone). The melt leaving the extruder is chilled and size reduced in known manner. The products of the process may be worked thermoplastically in the conventional manner.

The quantities given in the Examples are to be understood as parts, by weight or percentages by weight, unless otherwise indicated. A two-shaft screw extruder with kneader of the type ZSK 53 V manufactured by Werner & Pfleiderer, Stuttgart, with self-cleaning shaft fittings is used in Example 1. The length of the part in which the process takes place amounts to about 42 times the shaft diameter which amounts to 53 mm. The same shaft equipment is used in all the Examples, with the portion containing the kneading elements amounting to about 20%. The kneading elements are arranged in 3 kneading zones being located at the end of the first, second and third part of the extruder, respectively, as described in U.S. Pat. No. 3,963,679. The screw extruder consists of 12 housings of about equal length the first of which is equipped with a feed hopper for the rubber and fibers. The function and mode of operation of the screw extruder and of the kneading and conveyor elements of the shaft fitting and the like are described in detail in the trade publication by Werner & Pfleiderer and in German Offenlegungsschrift No. 2,302,564 (U.S. Pat. No. 3,963,679).

The fiber used in the Examples is a commercial glass fiber 12 μm in diameter and 6 mm in length which has been sized according to Example 1 of German Auslegeschrift No. 2,426,657.

Preparation of graft rubber (A):

(a) Graft Polymer Backbone:

A mixture of 68 parts of deionized water, 0.5 parts of the sodium salt of disproportionated abietic acid, 100 parts of butadiene, 0.4 parts of n-dodecyl mercaptan and 0.5 parts of potassium peroxydisulfate is introduced into a pressure-resistant stirrer vessel. The reaction is carried out at from 55° to 75° C. (initial to final temperature). A further 1.5 parts of the sodium salt of disproportionated abietic acid are added in the course of the reaction. Polymerization is continued until ca. 98% conversion is obtained.

| Characteristics of the polybutadiene latex obtained: | |
|---|---|
| Concentration: | 58.5% |
| Gel content in toluene: | >80% |
| Particle size | $d_{50} = 0.4$ μm |
| Freezing temperature | −80° C. (DIN 53 445) |

(b) Preparation of the graft polymer:

137 parts of the latex forming the backbone are introduced into a stirrer vessel and diluted with 118 parts of deionized water in which 0.5 parts of potassium peroxydisulfate have previously been dissolved. After the air has been displaced from the solution by passing a stream of nitrogen through it and heating to 65° C., the following are added at a uniform rate in two separate streams over a period of 4 hours: (a) 2 parts of the sodium salt of disproportionated acid (dissolved in 25 parts of water); and (b) a mixture of 5.6 parts of acrylonitrile and 14.4 parts of styrene. Stirring is continued for 2 hours at 65° C. after the components have been added in order to complete the reaction.

The graft polymer latex obtained in this way is coagulated with a 2% magnesium sulfate solution and the coagulate is separated, washed until salt-free and dried in a vacuum at 70° C.

| Properties of the graft polymer: | |
|---|---|
| Elastomer content: | 80% |
| Styrene content: | 14.4% |
| Acrylonitrile content: | 5.6% |

EXAMPLE 1

10 parts of graft rubber (A) and 10 parts of glass fibers are fed into the hopper of the screw extruder from two separate metering screws. The following raw materials (total 90 parts) are added in the following housings:

A mixture of:
36.1 parts of butane diol-(1,4)/adipic acid polyester (OH number 56),
0.11 parts of stearylamide,
0.18 parts of 2,6,2',6'-tetraisopropyldiphenylcarbodiimide,
0.22 parts of 2,6-di-tert.-butyl-4-methylphenol and
40.8 parts of 4,4'-diisocyanatodiphenylmethane (MDI) are introduced into the housing 2 and
12.63 parts of butane diol-(1,4) (NCO/OH=1.03) are added in housing 3.

The inflow temperature of the ester is ca. 100° C., that of MDI ca. 60° C. and that of the chain-lengthening agent 20° C. The housings of the screw extruder were adjusted to the following temperatures:

| Housing | 1 | 3 | 5 | 7 | 9 | 11 | 12 | head |
|---|---|---|---|---|---|---|---|---|
| Temperature | 100 | 180 | 200 | 220 | 220 | 180 | 140 | 190° C. |

The thermoplast obtained has the following properties after 2 days' storage, spraying and tempering for 24 hours at 110° C.:

| | Standard | | Measuring Units |
|---|---|---|---|
| Shore D hardness | DIN 53505 | 72 | |
| Flexural Stress | DIN 53452 | 47 | MPa |
| Elongation at break | DIN 53504 | 110 | % |
| Tensile strength | DIN 53504 | 40 | MPa |
| Notched impact strength at −30° C. | DIN 53453 | 21 | kJ/m² |
| Linear coefficient of expansion | VDE 0304/I | 21 ca. 50 · 10⁻⁶ | K⁻¹ |
| Heat bending test | own test standard | 0.8 | mm |

In our own test standard for the heat bending test, a test sample measuring 130×10×4 mm is supported over a width of 100 mm and loaded in the middle (in the direction of the 4 mm dimension) to produce a constant tension of 14.7 kPa. The results are measured over a period of 4 hours at an isothermal temperature of 105° C. Constant sagging is established after 2 hours in all the tests.

It may be seen that the materials according to the present invention have very high values for impact strength at low temperatures and thermal stability under load. The linear coefficient of expansion is satisfactory and the mechanical strength characteristics, including the elongation at break, are high. The adherence of polyurethane-based two-component lacquers is very good.

EXAMPLE 2

The procedure is the same as in Example 1, but instead of graft rubber (A) there is used a graft rubber (B) which has been prepared by a method analogous to that used for graft rubber (A), but instead of 137 parts of latex used as graft backbone, 85 parts are used and are diluted with 140 parts of water instead of with 118 parts. A total of 15 parts of acrylonitrile and 35 parts of styrene is added in the course of the grafting reaction so that the graft polymer contains 50% butadiene, 15% acrylonitrile and 35% styrene.

The following properties were measured on the tempered spray bodies (same test standard as in Example 1):

| Shore D hardness | 73 |
|---|---|
| Flexural strength | 50 MPa |
| Elongation at break | 80% |
| Tensile strength | 36 MPa |
| Notched impact strength at −30° C. | 13 kJ/m² |
| Linear coefficient of expansion | ca. 60 · 10⁻⁶ K⁻¹ |
| Heating bending test | 0.9 mm |

The results obtained are thus similar to those of Example 1 (with the exception of the characteristics at low temperatures). The cold characteristics are better in graft rubber (A), which is optimal in this respect.

EXAMPLE 3

Example 1 is repeated, but instead of graft rubber (A) there is used a commercial butadiene acrylonitrile rubber obtained by emulsion polymerization. The nitrile content of rubber is ca. 30%.

The following properties were determined on the tempered extrusion molded samples:

| Shore D | 69 |
|---|---|
| Flexural strength | 43 MPa |
| Elongation at break | 110% |
| Tensile strength | 39 MPa |
| Notched impact strength at −30° C. | 11 kJ/m² |
| Linear coefficient of expansion | ca. K⁻¹ 80 · 10⁻⁶ |
| Heat bending test | 1.0 mm |

EXAMPLE 4 (COMPARISON EXPERIMENT)

Example 1 is repeated, but instead of graft rubber (A) there is used the pure elastomer component of graft rubber (A), i.e. an emulsion polymerized polybutadiene.

The following properties are determined after extrusion molding and tempering:

| Shore D hardness | 62 |
|---|---|
| Flexural stress | 40 MPa |
| Elongation at break | 45% |
| Tensile strength | 22 MPa |
| Notched impact strength at −30° C. | 3 kJ/m² |
| Linear coefficient of expansion | 90 · 10⁻⁶ K⁻¹ |
| Heat bending test | 1.3 mm |

The impact strength at low temperatures obtained when using the apolar, crosslinked polybutadiene is poor. The strength characteristics are moderate.

EXAMPLE 5 (COMPARISON EXPERIMENT)

A polyurethane is prepared on the basis of the same raw materials as in Example 1, but using 18 parts of butane diol-(1,4) instead of 12.63 parts thereof, and a correspondingly larger quantity of MDI (NCO-/OH = 1.03). The thermoplast contains no glass fibers and (a) 10 parts of acrylonitrile rubber according to Example 3 or (b) no rubber component.

| Test values: | (a) | (b) | |
|---|---|---|---|
| Shore D hardness | 67 | 70 | |
| Elongation at break | 270 | 290 | % |
| Tensile strength | 41 | 49 | MPa |
| Notched impact strength (−30° C.) | 8 | 3 | kJ/m$^2$ |
| Linear coefficient of expansion | 220 | 200 · 10$^{-6}$ | K$^{-1}$ |
| Heat bending test | >2.5 | >2.5 | mm |
| Flexural stress | 24 | 27 | MPa |

These products, which are not according to the present invention, have insufficient thermal stability under load and high coefficients of thermal expansion, the latter being often a disadvantage for constructional purposes. The impact strength at low temperatures of the pure TPU is poor.

EXAMPLE 6

A polyurethane elastomer is prepared by the reaction of:
- 41.67 parts of polycaprolactone (OH number 56, acid number 0.2),
- 0.29 parts of 2,6-di-tert.-butyl-4-methyl-phenol,
- 0.17 parts of stearylamide,
- 35.37 parts of hexamethylene diisocyanate ("HDI"),
- 16.66 parts of butane diol-(1,4) and 0.83 parts of hexane diol-(1,6), in the double shaft screw extruder of Example 1 without fiber or rubber components, and the following variation of the process is then employed: an isocyanate prepolymer is first prepared separately from polycaprolactone + additives and 15.16 parts of hexamethylene diisocyanate in the course of two hours at 115° C. 57.29 parts of this prepolymer are then fed into the hopper of the screw extruder together with 6.25 parts of butane diol-(1,4) at 120° C. 20.21 parts of HDI, 10.41 parts of butane diol-(1,4) and 0.83 parts of hexane diol-(1,6) are introduced into housing 6. The finished thermoplast is then co-extruded with graft rubber (A) and glass fibers in a double shaft extruder. 5 parts by weight of graft rubber and varying quantities of glass fibers (according to Example 1) are used as follows:
(a) no glass fibers
(b) 5%, by weight, glass fibers
(c) 10%, by weight, glass fibers
(d) 20%, by weight, glass fibers After extrusion and tempering of the granulate, the following test values are found:

| | (a) | (b) | (c) | (d) |
|---|---|---|---|---|
| Shore D hardness | 60 | 62 | 64 | 67 |
| Elongation at break | 300 | 180 | 90 | 40% |
| Tensile strength | 32 | 27 | 30 | 35 MPa |
| Notched impact strength (−30° C.) | 8 | 11 | 13 | 15 kJ/m$^2$ |
| Linear coefficient of expansion | 190 | 80 | 50 | 30 · 10$^{-6}$ K$^{-1}$ |
| Flexural stress | 13 | 21 | 38 | 70 MPa |
| Heat bending test | >2.5 | 1.0 | 0.9 | 0.8 mm |

The greatest stiffening factor is obtained with high glass fiber contents and it is necessary to reach a compromise between the stiffening effect and the elongation at break values, depending on the purpose for which the product is to be used.

What is claimed is:

1. Thermoplastic chemical material comprising
    (A) from 60 to 97%, by weight, based on (A)+(B), of a thermoplastic polyurethane; and
    (B) from 40 to 3%, by weight, based on (A)+(B), of glass fiber reinforcing material; and
    (C) from 36 to 3 parts, by weight, based on 100 parts of (A)+(B), of a polar polymer containing at least 30% by weight of butadiene, isoprene and/or acrylic acid ester units which is a graft polymer having a rubbery polymer backbone containing butadiene, isoprene and/or acrylic ester units and grafted polar monomer selected from the group consisting of acrylic acid alkyl esters, methacrylic acid alkyl ester and/or acrylonitrile, styrene, α-methyl styrene and mixtures thereof in which the proportion, by weight of graft polymer backbone to graft monomer is in the range from 50:50 to 95:5.

2. The chemical material of claim 1, wherein said polar polymer is present in an amount of from 15 to 4 parts, by weight.

3. The chemical material of claim 1, wherein said polar polymer contains more than 20%, by weight, of one or more of the polar monomers, acrylic acid alkyl esters, methacrylic acid alkyl esters, acrylonitrile, styrene and α-methylstyrene.

4. The chemical material of claim 1, wherein said graft basis is an elastomer having a 1,3-diene content of from 50 to 95%, by weight, and a freezing temperature below −30° C.

5. The chemical material of claim 4, wherein said graft basis is a homo- or co-polymer of butadiene and-/or acrylic acid alkyl esters.

6. The chemical material of claim 1, wherein component (B) is sized glass fibers having a diameter of from 8 to 30 mμ and a length of from 0.3 to 100 mm.

7. The chemical material of claim 1, wherein said component (A) is prepared from a long chain polyol having a molecular weight from 400 to 10,000, a diisocyanate, and a chain-extending agent having a molecular weight of 400 or less, and wherein the NCO/OH ratio is from 0.95:1 to 1.10:1.

8. A process for the production of thermoplastic chemical materials, comprising mixing and co-extruding:
    (A) from 60 to 97%, by weight, based on (A)+(B), of a thermoplastic polyurethane; and
    (B) from 40 to 3%, by weight, based on (A)+(B), of a glass fiber material; and
    (C) from 36 to 3 parts, by weight, based on 100 parts of (A)+(B), of a polar polymer containing at least 30% by weight of butadiene, isoprene and/or acrylic acid ester units which is a graft polymer having a rubbery polymer backbone containing butadiene, isoprene and/or acrylic ester units and grafted polar monomer selected from the group consisting of acrylic and alkyl esters, methacrylic acid alkyl esters, and/or acrylonitrile, styrene, α-methyl styrene and mixtures thereof in which the proportion by weight of a graft polymer backbone to graft monomer is in the range from 50:50 to 95:5.

9. The process of claim 8, wherein components (B) and (C) are added to the polyurethane-forming components before or during preparation of component (A) in a double shaft screw extruder.

10. The chemical material of claim 1 in which the polar polymer is a graft polymer in which the proportion by weight, of graft polymer backbone to graft monomer is in the range from 70:30 to 87.5:12.5.

11. The chemical material of claim 10 in which the graft polymer backbone is a rubber-like polymer having a glass transition temperature lower than −30° C.

12. The chemical material of claim 11 in which the graft polymer backbone contains from 50 to 95 weight % diene.

13. The chemical material of claim 1 in which the graft polymer backbone is a rubber-like polymer having a glass transition temperature lower than −30° C.

14. The chemical material of claim 1 in which the graft polymer backbone contains from 50 to 95 weight % diene.

15. The chemical material of claim 1 in which the graft polymer backbone contains from 75 to 95 weight % diene.

16. The chemical material of claim 1 in which the graft polymer backbone contains from 50 to 95 weight % 1,3-diene rubber.

17. The chemical material of claim 1 in which the graft polymer backbone contains from 50 to 95 weight % butadiene, isoprene and/or acrylic ester units.

18. The chemical material of claim 1 in which the polar monomer is an acrylic acid alkyl ester and/or methacrylic acid alkyl ester.

19. The chemical material of claim 18 in which the alkyl group of the alkyl ester contains from 4 to 10 carbon atoms.

20. The chemical material of claim 1 in which the graft monomer is a mixture of styrene and acrylonitrile in a proportion of from 9:1 to 1:1.

* * * * *